United States Patent [19]
Pribyl

[11] Patent Number: 6,056,305
[45] Date of Patent: May 2, 2000

[54] STEERING AXLE SUSPENSION SYSTEM

[76] Inventor: Myron Pribyl, N946 Drumm Rd., Denmark, Wis. 54208

[21] Appl. No.: 08/962,829

[22] Filed: Nov. 3, 1997

[51] Int. Cl.[7] .................................................. B60A 11/04
[52] U.S. Cl. ............................. 280/124.157; 280/124.158
[58] Field of Search ...................... 280/124.157, 124.156

[56] References Cited

U.S. PATENT DOCUMENTS

| | | | |
|---|---|---|---|
| 3,013,809 | 12/1961 | Szostak | 280/112 |
| 3,025,076 | 3/1962 | Davies et al. | 280/124.157 |
| 3,732,942 | 5/1973 | Hobbensiefken | 180/11 |
| 3,960,388 | 6/1976 | Strader et al. | 280/693 |
| 3,964,764 | 6/1976 | Rickardsson | 280/124.157 |
| 4,181,323 | 1/1980 | Raidel | 280/711 |
| 4,494,771 | 1/1985 | Raidel | 280/711 |
| 4,500,112 | 2/1985 | Raidel | 280/693 |
| 4,529,224 | 7/1985 | Raidel | 280/711 |
| 4,580,798 | 4/1986 | Roelofs | 280/6 |
| 4,596,402 | 6/1986 | Raidel | 280/711 |
| 5,029,885 | 7/1991 | Steiner | 280/124.157 |
| 5,046,752 | 9/1991 | Stephens et al. | 280/124.157 |

Primary Examiner—Kenneth R. Rice
Attorney, Agent, or Firm—Brian G. Gilpin; Godfrey & Kahn, S.C.

[57] ABSTRACT

A steering axle suspension system for connecting a frame to a front steering axle in a truck or other heavy vehicle has a substantially non-flexible beam having a front end, a central portion, and a rear end. The central portion of the beam is mounted to the front steering axle and a mounting bracket is mounted on the front end of the beam. The mounting bracket has a bushing located therein with a trunnion shaft extending therethrough. A shaft engagement housing is attached to the frame and non-rotatably engages the trunnion shaft such that the beam can pivot with respect to the frame at the front end. An air spring is sandwiched between the beam and the frame. The air spring is capable of transferring weight from the frame to the axle and the air in the air spring is adjusted by an automatic leveling valve capable of interrelating the amount of air in the air spring to the distance between the frame and the beam. A shock absorber between the frame and the beam is pivotably connected to the beam at the rear end. For stiffening the suspension system with respect to the frame, a torque arm is pivotably connected to the beam and is pivotably connected to the frame on the opposite side of the vehicle.

4 Claims, 4 Drawing Sheets

FIG_1
PRIOR ART
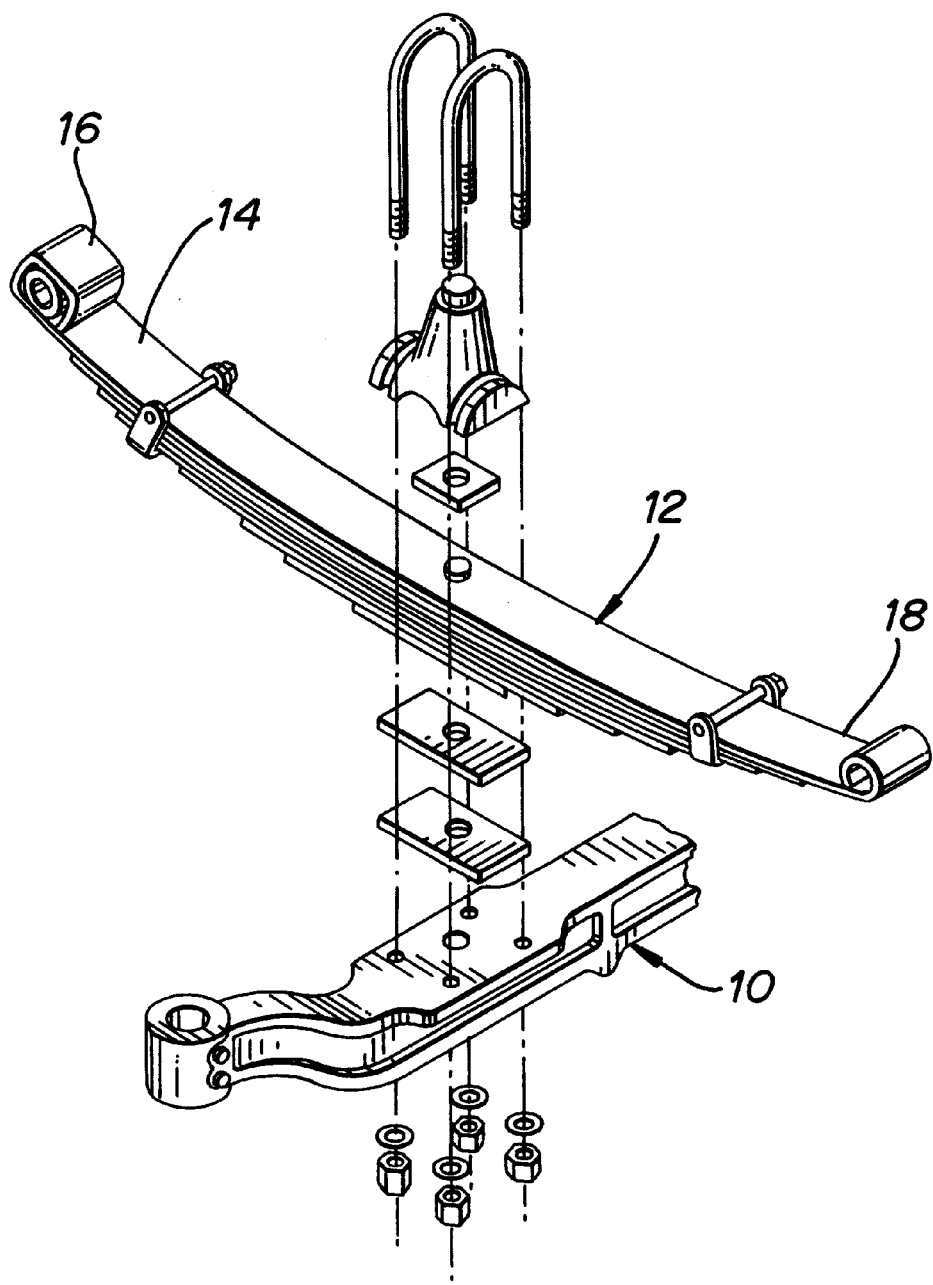

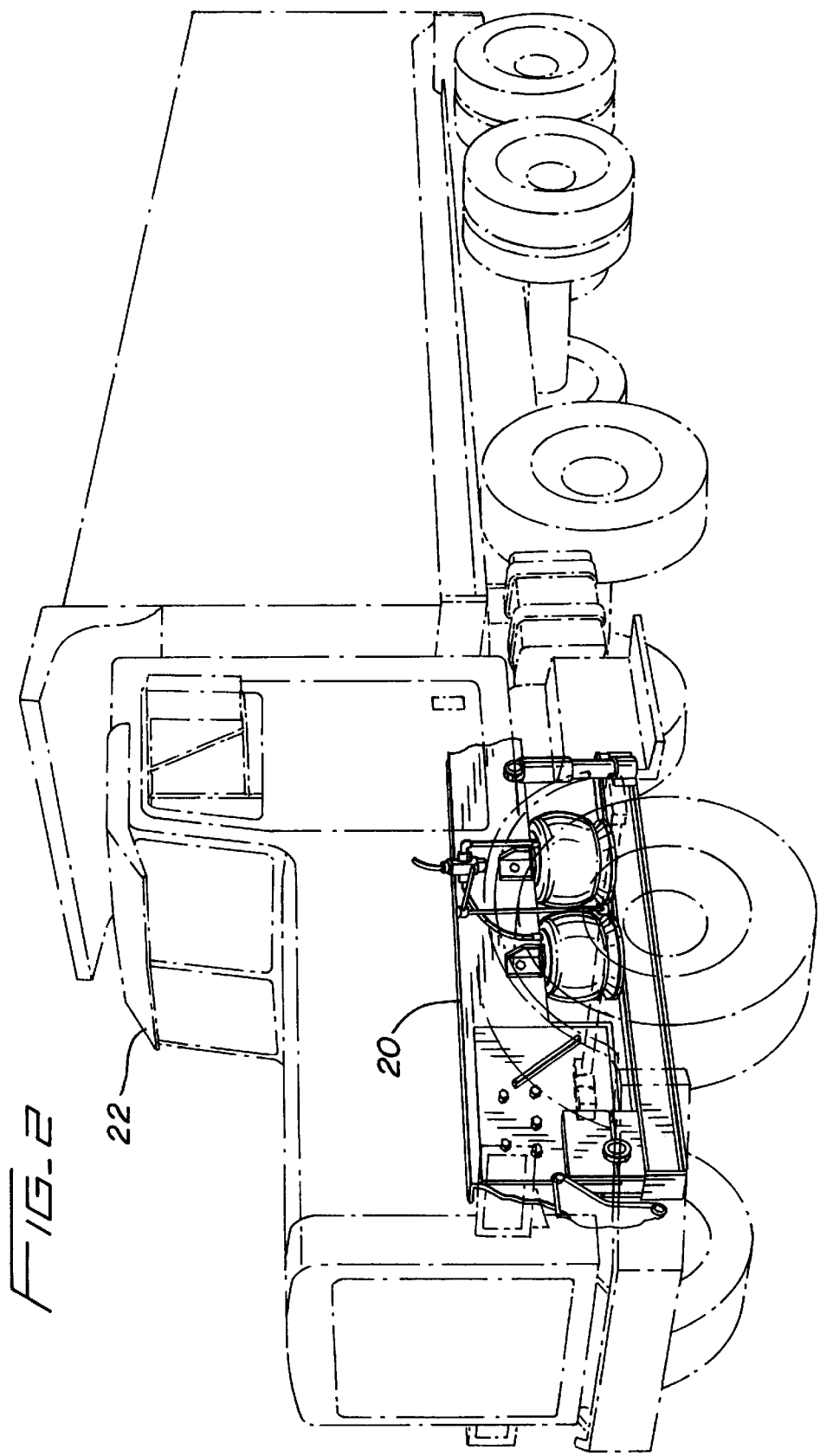

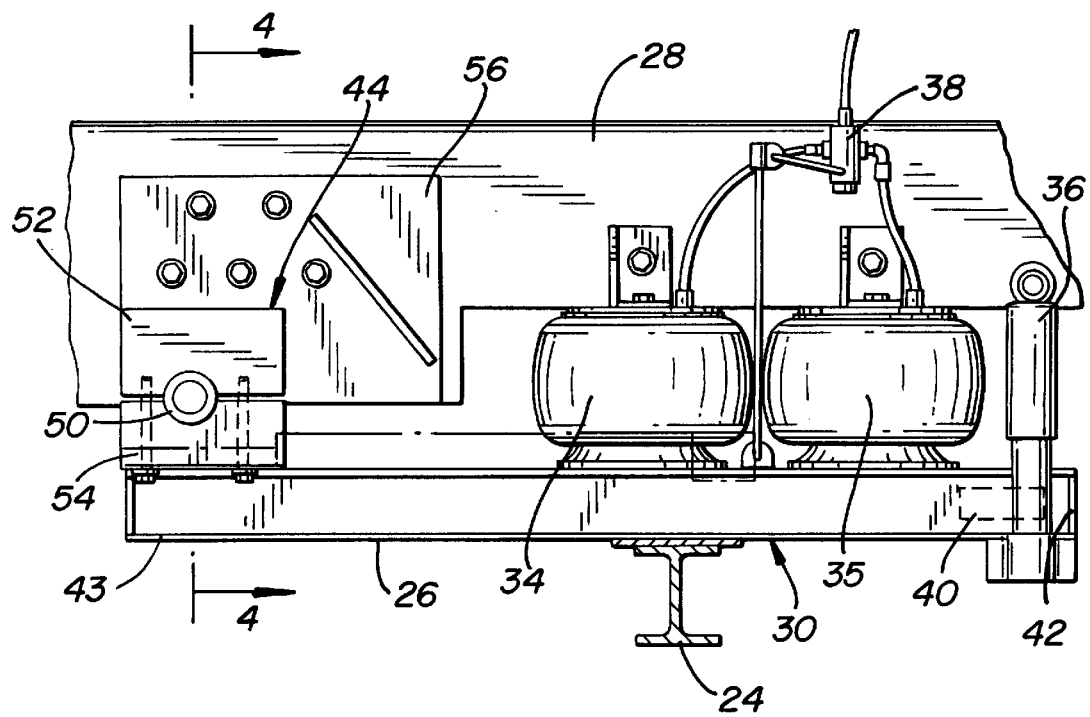
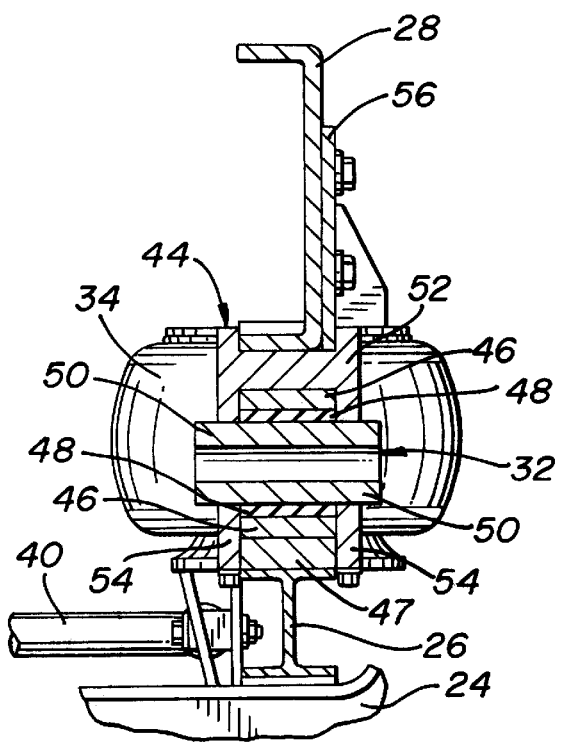

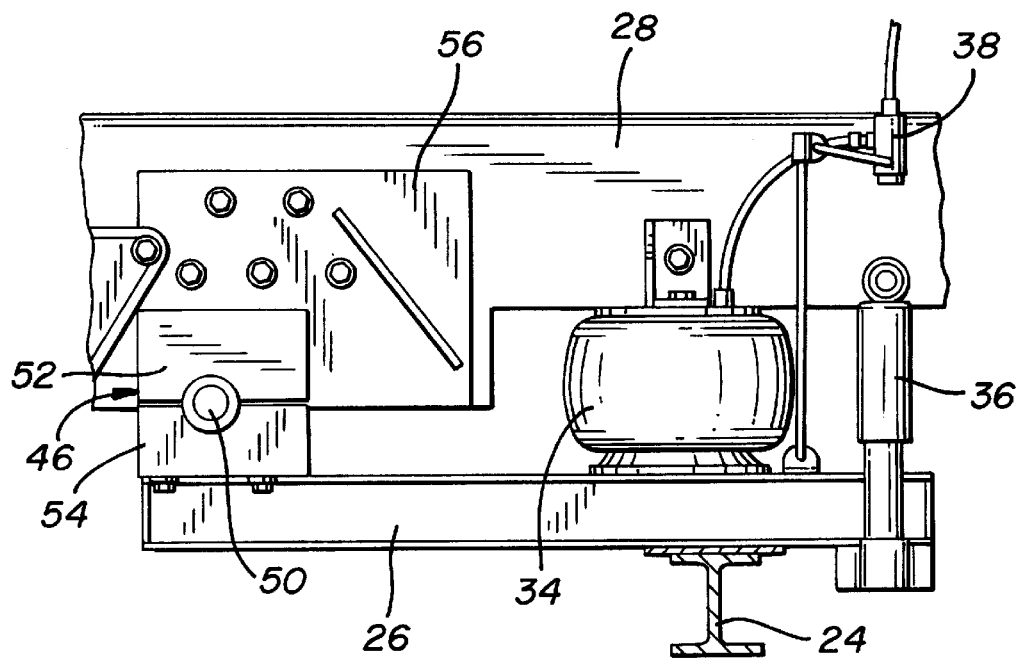
FIG_5
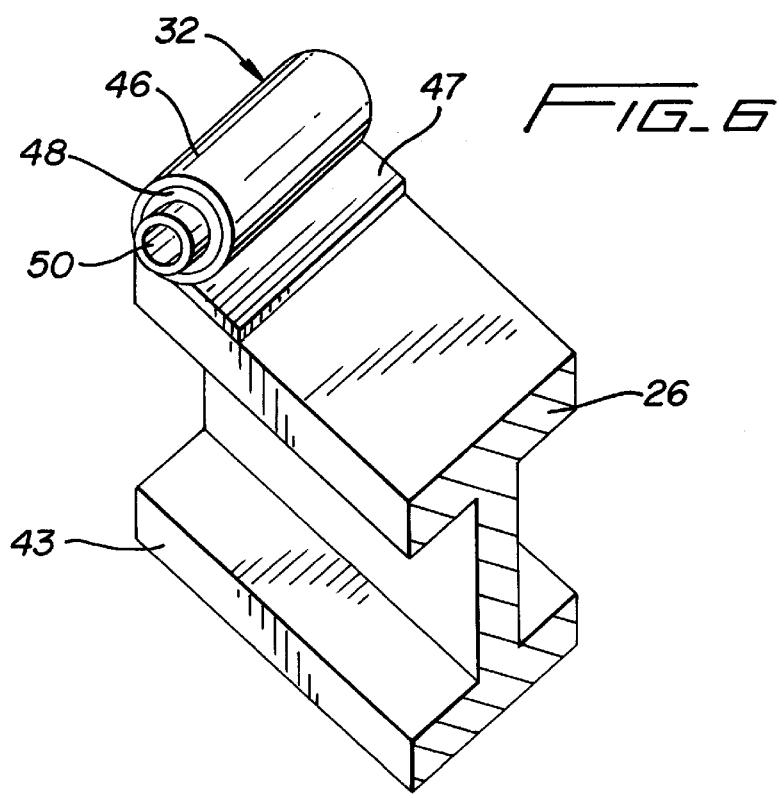
FIG_6

STEERING AXLE SUSPENSION SYSTEM

FIELD OF THE INVENTION

The present invention relates generally to suspension systems for trucks or other heavy vehicles and more particularly to a low-maintenance, auto-leveling, suspension system for use in connection with the steering axle of a truck or other heavy vehicle.

BACKGROUND OF THE INVENTION

Trucks and other heavy vehicles have not traditionally been known for offering a smooth, comfortable ride. Quite to the contrary, most trucks and other heavy vehicles do not sufficiently cushion the bumps and contours of the road and the vehicle, load, and driver must absorb the shocks and impacts of traveling on rough or bumpy pavement. This inability to provide adequate cushion from the bumps and roughness of the road leads to increased wear on vehicle parts resulting in increased maintenance. Further, damage to the vehicle's load may occur if the load is fragile or the bumps severe. Perhaps more important, this inability to adequately cushion the ride can lead to serious safety problems such as driver fatigue and vehicle mishandling.

Most trucks and other heavy vehicles use leaf spring suspension systems for cushioning the front steering axle of the vehicle. FIG. 1 depicts a typical leaf spring suspension system used on the front steering axle of a heavy vehicle (not shown). The axle 10 is bolted or otherwise attached to the central and thickest portion of a leaf spring stack 12. One end 14 of the leaf spring stack 12 pivotably attaches to the frame of the vehicle through a fitting 16 which requires regular maintenance including greasing. Typically, the other end 18 of the leaf spring stack 12 connects to the frame through a frame shackle similar to the fitting 16 and shock absorber (not shown) for dampening. Leaf spring suspension systems are heavy, require regular maintenance, and do not provide a smooth ride. Additionally, the cost of leaf spring stacks, which usually must be replaced every several years, can be quite high.

The use of air suspension systems in connection with the rear axles of trailers, tractors, dump trucks, and other heavy vehicles is well known in the art. Attempts to adapt such air suspension systems for the front steering axle of heavy vehicles have not proven successful because of the complexity of the moving parts involved in such systems, and the time and expense associated with replacing complicated parts. Air suspension systems typically offer a significantly better ride than leaf spring systems but require more space to install and generally require a much higher degree of maintenance especially due to the use of multiple grease fittings. One such system, disclosed in U.S. Pat. No. 4,181,323, uses four such grease fittings for a single-axle suspension and eight such fittings for a dual axle suspension and is thus, not a good solution.

Accordingly, there is a need for a low maintenance, high shock absorption, suspension system that can be used in connection with the front steering axle of trucks or other heavy vehicles. Further, it would be desirable if the suspension system weighed less than leaf spring systems, did not use any high-maintenance grease fittings, could keep the front of the vehicle level at all times, provided a smooth ride with less vibration than existing systems, had few moving parts to wear out, and stabilized the vehicle under extreme loading conditions.

OBJECTS AND SUMMARY OF THE INVENTION

Therefore, it is an object of the present invention to provide a steering axle suspension system that provides a smooth, low-vibration ride.

It is a further object of the present invention to provide a steering axle suspension system that weighs less than existing leaf spring systems.

It is an additional object of the present invention to provide a steering axle suspension system that requires little or no maintenance.

It is yet another object of the present invention to provide a steering axle suspension system capable of maintaining vehicle stability by keeping the front of the vehicle level at all times.

It is still another object of the present invention to provide a steering axle suspension system that is cost-effective to install and has relatively few expensive parts requiring frequent replacement.

The present invention provides the above-identified and many additional objects by providing a steering axle suspension that weighs less than existing leaf spring suspensions, has no high-maintenance grease fittings, is capable of keeping the front of the vehicle level at all times, provides a smooth ride with low vibration, has few moving parts, and is easily installed to replace leaf springs.

The steering axle suspension system in accordance with the present invention preferably includes a beam substantially perpendicular to the axle and substantially parallel to the frame of the vehicle with the central portion of the beam substantially over the axle. The beam is pivotably connected to the frame of the vehicle by a modified trunnion connection, at least one air spring, and a shock absorber. Also preferably included in the system are an automatic leveling device and a torque arm for stabilization.

In operation, the beam acts to transfer the weight of the vehicle to the axle and, in conjunction with the other components, softens the ride of the vehicle. The beam pivotably connects to the frame of the vehicle at the front or proximal end of the beam using the trunnion assembly which includes a trunnion shaft engagement housing attached to the frame. A trunnion bracket is located at a corresponding location at the front or proximal end of the beam. A rubber bushing extends through the trunnion bracket and a trunnion shaft extends through the bushing. The trunnion shaft is non-rotatably engaged by the shaft engagement housing. Because the bushing is flexible, this arrangement allows pivoting of the trunnion bracket attached to the beam with respect to the trunnion shaft non-rotatably engaged by the frame. Such an arrangement allows the beam to pivot with respect to the frame at the location of the trunnion assembly. The use of the modified trunnion assembly including a rubber bushing instead of a grease fitting greatly reduces the time and expense involved in properly maintaining the pivotable connection and reduces the frequency of replacement of the pivotable connection.

Along the beam, one or more air springs are used to support the weight of the vehicle and provide a cushioned ride. The air springs are sandwiched between the frame and the central portion of the beam with one spring substantially directly above the axle. The amount of air in the springs is adjusted using an automatic leveling valve capable of interrelating the amount of air in the springs to the distance between the frame and the beam. The number of air springs employed in a particular vehicle can be modified depending upon the weight carried by the axle. For example, when installed in a heavy dump truck, the axle may be required to support in excess of 20,000 pounds and two air springs are preferably used to support such weight. The front axle of a semi-tractor may be called on to support around 12,000 pounds and only one air spring is preferably used. In either case, the load carrying ability of the suspension system is increased if at least one air spring is located between the frame and the beam substantially directly above the axle. In an installation including two air springs, the second spring is placed on the side of the axle distant from the trunnion assembly. A shock absorber is mounted between the frame and the rear or distal end of the beam to provide dampening as is conventional in the art.

These are just some of the features and advantages of the present invention. Many others will become apparent by reference to the detailed description of the invention taken in combination with the accompanying drawings.

BRIEF DESCRIPTION OF THE DRAWINGS

FIG. 1 is a side elevation view of a prior art steering axle leaf spring suspension system;

FIG. 2 is a perspective view of a steering axle suspension system in accordance with the present invention installed on a heavy dump truck shown in phantom;

FIG. 3 is a side elevation view of the steering axle suspension system of FIG. 2;

FIG. 4 is a partial cross-sectional view of the steering axle suspension system of FIG. 2 taken generally along the line 3—3; and FIG. 5 is a side elevation view of one alternative embodiment of the invention.

FIG. 6 is a perspective detail view of the pivotable trunnion-type assembly.

DETAILED DESCRIPTION

As illustrated in FIG. 2, the steering axle suspension system, identified generally as number 20, is located on the front end of a vehicle (shown in phantom and identified generally as number 22) and transfers the vehicle load to the road. For brevity, references made herein to "truck" or "vehicle" should be considered to include trucks, semi-tractors, and other heavy vehicles and it should be understood that the invention disclosed herein may be practically applied in a wide range of vehicles.

A preferred embodiment of the steering axle suspension system 20 in accordance with the present invention includes several primary components arranged to provide suspension for the front steering axle 24 (see FIG. 3). The suspension includes a beam 26 substantially perpendicular to the axle 24 and substantially parallel to the frame 28 of the vehicle 22 with the central portion 30 of the beam 26 substantially directly over the axle 24. The beam 26 is connected to the frame 28 of the vehicle 22 by a pivotable modified trunnion assembly identified generally as 32 (shown in detail in FIGS. 4 and 6), at least one air spring 34, 35, and a shock absorber 36. Also included in the system are an automatic leveling device 38 and a torque arm 40 for stabilizing the suspension system 20.

The beam 26 acts to transfer the weight of the vehicle 22 from the frame 28 to the axle 24 and, in conjunction with the other components, softens the ride of the vehicle 22. While the beam 26 is preferably an I-beam for ease of attaching other system components, other shapes may be used. The beam 26 should be sufficiently strong to resist deflection even under extreme vehicle 22 loadings and it is within the ability of one of ordinary skill in the art to properly choose a material for and dimension a beam 26 for application in a wide variety of vehicles.

The beam 26 is pivotably connected to the frame 28 of the vehicle 22 at the front or proximal end 43 of the beam 26 using a pivotable modified trunnion assembly 32 or other equivalent pivotable connection. A preferred embodiment of the assembly 32 includes a trunnion shaft engagement housing 44 attached to the frame 28. As shown in detail in FIG. 6, a trunnion bracket 46 is located at a corresponding location at the proximal end 43 of the beam 26. The trunnion bracket 46 is cylindricaly shaped and is welded or otherwise non-rotatably mounted to the proximal end 43 of the beam 26. A mounting plate 47 or other structure may be used in completing the connection of the trunnion bracket 46 to the beam 26. A rubber bushing 48 extends through the trunnion bracket 46 and a trunnion shaft 50 is installed to extend through the bushing 48. The bushing 48 may be made from rubber or any other suitably flexible material. As shown in FIGS. 3, 4, and 6, the trunnion shaft 50 is preferably hollow-tube-shaped but may be solid or have another cross-sectional shape if desired. To stabilize the steering axle suspension system 20, a torque arm 40 pivotably connects the second or rearward end of the beam 26 to the frame 28 on the opposite side of the vehicle 22.

The trunnion shaft 50 is non-rotatably engaged by the shaft engagement housing 44. This is accomplished by bolting a lower section 54 to an upper section 52 such that the trunnion shaft 44 cannot rotate between the two sections 52 and 54. The upper section 52 is attached to the frame 28 by a mounting plate 56. The mounting plate 56 and upper section 52 may be formed as a unitary piece or may be welded or otherwise connected together. This arrangement allows pivoting of the trunnion bracket 46 attached to the beam 26 with respect to the trunnion shaft 50 which is non-rotatably engaged within the trunnion shaft engagement housing 44. Such an arrangement allows the beam 26 to pivot with respect to the frame 28 at the location of the trunnion assembly 32. As the motion of the beam 26 generally does not exceed a few inches at the central portion 30, the pivotable trunnion assembly 32 is only required to rotate a few degrees. The use of a modified trunnion assembly 32 including a bushing 48 instead of a grease fitting as in prior art systems greatly reduces the time and expense involved in properly maintaining the pivotable connection 30 and reduces the frequency of replacement of the connection.

Along the beam 26, air springs 34 and 35 are preferably used to support the weight of the vehicle 22 and provide a cushioned ride. The air springs 34 and 35 are sandwiched between the frame 28 and the beam 26 with the first air spring 34 located along the beam 26 substantially directly above the axle 24. The second air spring 35 is preferably located on the rear or distal end 42 of the beam 26. One or both of the air springs 34, 35 may have to be offset toward the center of the vehicle 22 from the center of the beam 26 in order to allow sufficient room for steering. There are a wide variety of air springs presently available for use in connection with rear axle air suspension systems. Any number of these air springs or their equivalent may be used as the springs in the present invention and it is within the ability of one of ordinary skill in the art to select an appropriate spring for a particular application of the present invention depending on space, cost, and weight considerations. One preferred embodiment of the present invention uses rolling lobe style air springs with internal bumpers designed to limit spring compression and prevent damage to the suspension and vehicle because of a loss of air pressure in the air spring.

The use of the word "air" in describing the springs should not be interpreted as limiting. Rather, other fluids, including hydraulics, that may from time to time be developed, may be used. As such, "air spring" should be interpreted to include other equivalent structure as may be developed for use in suspension systems to cushion the ride, including other pneumatic or hydraulic springs.

The amount of air in the air springs 34, 35 is preferably adjusted using an automatic leveling valve 38 capable of interrelating the amount of air in the air springs 34, 35 to the distance between the frame 28 and the beam 26. Such automatic leveling valves are known for use in connection with rear air suspension systems. In the preferred embodiment, automatic leveling valves 38 are used on both sides of the vehicle 22.

The number of springs 34, 35 employed in a particular vehicle depends upon the weight carried by the axle 24. For example, when installed in a heavy dump truck, the axle may be required to support in excess of 20,000 pounds and two air springs are probably required to support such weight. The front axle of a semi-tractor may be called on to support around 12,000 pounds and only one air spring is probably required. In either case, the load carrying ability of the suspension system 20 is increased if at least one spring 34 is located between the frame 28 and the beam 26 substantially directly above the axle 24. In an installation including two air springs 34 and 35, the second spring 35 is placed on the side of the axle 24 distant from the trunnion assembly 32. A shock absorber 36 is mounted between the frame 28 and the distal end 42 of the beam 26 to provide dampening as is conventional in the art.

In one alternative embodiment of the present invention, shown in FIG. 5, the steering axle suspension system 20 uses only one air spring 34 located along the beam 26 substantially directly above the axle 24. This embodiment is used in vehicles 22 requiring a lesser load to be transferred from the frame 28 to the axle 24. Such vehicles include semi-tractors and other lower load vehicles. In this embodiment, the same pivotable modified trunnion assembly 32 is used at the proximal end 43 of the beam 26 to make the pivotable connection to the frame 28. As with the two air spring embodiment (FIGS. 2 and 3), a shock absorber 36 is used to dampen shock and a torque arm 40 connects the suspension system 20 to the frame on the opposite side of the vehicle 22. Of course, other embodiments of the steering axle suspension system 20 may be possible depending on the requirements and constraints of the particular vehicle 22.

In particular installations, because of space constraints, the orientation of the steering axle suspension system 20 may have to be reversed. In such installations, the pivotable trunnion assembly 32 is on the distal end of the beam 26 and the shock absorber 36 and torque arm 40 are connected to the proximal end of the beam 26. Such an orientation of the system 20 should not affect performance.

In retrofitting a particular vehicle to install the steering axle suspension system 20 in accordance with the present invention, the mechanic first removes the existing leaf spring suspension (see FIG. 1) including the fittings 16 connecting the leaf spring stack 12 to the frame of the vehicle and the shock absorber. In the first step in installing the new suspension, the installer bolts or otherwise attaches the mounting plate 56 including the upper section 56 of the shaft engagement housing 44 to the frame 28. The air bags 34, 35 and shock absorber 36 are then bolted or otherwise attached to the frame 28. Next, the installer prepares the beam 26 by welding or otherwise attaching the trunnion bracket 46 to the end of the beam 26 and inserts the rubber bushing 48 through the trunnion bracket 46 and the trunnion shaft 50 through he bushing 48. The mechanic then bolts or otherwise attaches the beam 26 to the axle 24 of the vehicle 22 and bolts the lower section 54 of the shaft engagement housing 44 to the upper section 56 to non-rotatably secure the trunnion shaft 50. The air bags 34, 35 are then attached to the beam 26 and the shock absorber 36 and torque arm 40 are bolted in place. Finally, the automatic leveling device 38 is installed and the air lines are attached to an air supply. Of course, these steps may be accomplished in a variety of orders and it is within the skill of a person of ordinary skill in the art to perform such an installation on a variety of vehicles.

As illustrated by the foregoing description and shown in the Figures, the present invention is more suitable as a steering axle suspension than are existing devices. The present invention overcomes the limitations and disadvantages of existing devices by utilizing an effective design of a steering axle suspension that provides a smooth comfortable ride and requires only minimal maintenance.

Although the invention has been herein shown and described in what is perceived to be the most practical and preferred embodiments, it is to be understood that the invention is not intended to be limited to those specific embodiments. Rather, it is recognized that modifications may be made by one of skill in the art without departing from the spirit or intent of the invention and, therefore, the invention is to be taken as including all reasonable equivalents to the subject matter of the appended claims.

What is claimed is:

1. A suspension system for supporting a frame of a vehicle on a steering axle, the system comprising:

a substantially rigid beam having a proximal end, a central portion, and a distal end, the central portion of the beam mounted to the steering axle;

a trunnion bracket at the proximal end of the beam, the trunnion bracket having a bushing located therein;

a shaft engagement housing attached to the frame, the shaft engagement housing including an upper section and a lower section, the upper section formed as part of a mounting plate attached to the frame;

a trunnion shaft extending through the bushing and non-rotatably engaging the shaft engagement housing, the trunnion shaft extending through and engaging the bushing such that the beam can pivot with respect to the frame at its proximal end, the lower section of the shaft engagement housing bolted to the upper section such that the trunnion shaft is non-rotatably secured therebetween;

an air spring sandwiched between the beam and the frame, the air spring capable of transferring weight from the frame to the axle, wherein the air in the air spring is adjusted by an automatic leveling valve capable of interrelating the amount of air in the air spring to the distance between the frame and the beam;

a second air spring sandwiched between the beam and the frame, wherein the air in the air spring is automatically adjusted by the automatic leveling valve; and a shock absorber located between the frame and the beam, the shock absorber pivotably connected to the beam at its distal end.

2. The suspension system of claim 1 further comprising a torque arm pivotably connected to the distal end of the beam and pivotably connected to the frame on the opposite side of the vehicle.

3. A system for supporting and transferring a portion of the weight of a vehicle comprising:

a frame substantially rigidly attached to the vehicle;

substantially rigid beam having a proximal end, a central portion, and a distal end, the proximal end of the beam connected to the frame;

a trunnion bracket at the proximal end of the beam, the trunnion bracket having a bushing located therein, the bushing having a trunnion shaft extending therethrough;

a shaft engagement housing attached to the frame and non-rotatably engaging the trunnion shaft, the trunnion shaft extending through and engaging the bushing such that the beam can pivot with respect to the frame at the proximal end, the shaft engagement housing having an upper section and a lower section, the upper section formed as part of a mounting plate attached to the frame, the lower section bolted to the upper section such that the trunnion shaft is non-rotatably secured therebetween;

an air spring sandwiched between the beam and the frame, the air spring transferring weight from the frame to the axle, the air spring is adjusted by an automatic leveling valve interrelating the amount of air in the air spring to the distance between the frame and the beam;

a second air spring sandwiched between the beam and the frame, wherein the air in the second air spring is automatically adjusted by the automatic leveling valve.

4. The suspension system of claim 3 further comprising a torque arm pivotably connected to the beam and pivotably connected to the frame on the opposite side of the vehicle.

* * * * *